(12) United States Patent
Costura et al.

(10) Patent No.: US 7,332,016 B2
(45) Date of Patent: Feb. 19, 2008

(54) PARTICULATE TRAP WITH SELECTIVE BLOCKING ELEMENT

(75) Inventors: Joanna Louise Costura, Peoria, IL (US); Matthew E. Williams, East Peoria, IL (US); Matthew T. Kiser, Chillicothe, IL (US); Cornelius N. Opris, Peoria, IL (US); J. Josh Driscoll, Dunlap, IL (US); Dave Michael Thaler, Mossville, IL (US); Robert L. Meyer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 317 days.

(21) Appl. No.: 10/902,148

(22) Filed: Jul. 30, 2004

(65) Prior Publication Data

US 2006/0021507 A1 Feb. 2, 2006

(51) Int. Cl.
*B01D 46/00* (2006.01)
(52) U.S. Cl. .............................. 95/20; 95/273; 95/278; 96/380; 96/421; 60/297; 60/311; 55/282.3; 55/418; 55/523; 55/DIG. 30
(58) Field of Classification Search .................. 96/421, 96/422, 380, 384; 95/19, 20, 23; 55/282.3, 55/523, 312, 418
See application file for complete search history.

(56) References Cited

U.S. PATENT DOCUMENTS

| 4,318,720 | A | * | 3/1982 | Hoggatt ........................ 96/135 |
| 4,840,028 | A |   | 6/1989 | Kusuda et al. |
| 5,009,065 | A |   | 4/1991 | Howe et al. |
| 5,171,337 | A |   | 12/1992 | Pollock |
| 5,212,948 | A |   | 5/1993 | Gillingham et al. |
| 5,293,742 | A |   | 3/1994 | Gillingham et al. |
| 5,357,755 | A |   | 10/1994 | Gillingham et al. |
| 5,489,319 | A | * | 2/1996 | Tokuda et al. ................. 96/400 |
| 5,800,790 | A | * | 9/1998 | Imamura et al. ............. 422/174 |
| 6,010,547 | A | * | 1/2000 | Jeong et al. ................ 55/282.3 |
| 6,220,907 | B1 |  | 4/2001 | Shimizu |
| 6,233,926 | B1 | * | 5/2001 | Bailey et al. .................. 60/295 |
| 6,423,275 | B1 |  | 7/2002 | D'Souza |
| 6,572,682 | B2 |  | 6/2003 | Peter et al. |
| 6,694,727 | B1 |  | 2/2004 | Crawley et al. |
| 6,931,842 | B2 | * | 8/2005 | Ohtake et al. ................. 60/295 |
| 6,969,413 | B2 | * | 11/2005 | Yahata et al. .............. 55/282.3 |
| 7,169,200 | B2 | * | 1/2007 | Kolstad et al. ............. 55/282.2 |
| 7,185,489 | B2 | * | 3/2007 | Kolstad et al. ............... 60/297 |

OTHER PUBLICATIONS

Igarashi et al, "Development of Diesel Particulate Trap Systems for City Buses," Jan. 25, 1991, Society of Automotive Engineers: The Engineering Society For Advancing Mobility Land Sea Air and Space P-240, pp. 83-92.*

* cited by examiner

*Primary Examiner*—Duane Smith
*Assistant Examiner*—Sonji Turner
(74) *Attorney, Agent, or Firm*—Finnegan, Henderson, Farabow, Garrett & Dunner

(57) ABSTRACT

A particulate trap has a housing with an inlet and an outlet. The particulate trap also has a plurality of fluidly isolated filters stacked within the housing, between the inlet and the outlet. The stacked plurality of filters have a stack direction and a transverse direction and the flow of exhaust is directed through the plurality of filters in the transverse direction. The particulate trap further has an actuator with a blocking portion configured for linear movement to selectively block exhaust flow through each of the plurality of filters.

42 Claims, 7 Drawing Sheets

PARTICULATE TRAP WITH SELECTIVE BLOCKING ELEMENT

TECHNICAL FIELD

The present disclosure relates generally to a particulate trap and, more particularly, to a particulate trap with a selective blocking element.

BACKGROUND

Internal combustion engines, including diesel engines, gasoline engines, natural gas engines, and other engines known in the art, may exhaust a complex mixture of air pollutants. The air pollutants may be composed of gaseous compounds and solid particulate matter, which may include unburned carbon particles called soot.

Due to increased attention on the environment, exhaust emission standards have become more stringent. The amount of particulates emitted from an engine may be regulated depending on the type of engine, size of engine, and/or class of engine. One method that has been implemented by engine manufacturers to comply with the regulation of particulate matter exhausted to the environment has been to remove the particulate matter from the exhaust flow of an engine using a particulate trap. A particulate trap is a filter designed to trap particulate matter in, for example, a wire mesh filtering media. Using the particulate trap for extended periods of time may enable the particulate matter to accumulate in the wire mesh filtering media, thereby reducing filter functionality and engine performance.

Various regeneration techniques may be employed to combat the effects of accumulating particulate matter. For example, U.S. Pat. No. 5,009,065 (the '065 patent) issued to Howe et al. on Apr. 23, 1991, describes using an exhaust processor to filter particulate matter from a combustion product. The exhaust processor of the '065 patent is designed for use in a diesel engine and includes a primary substrate and an auxiliary substrate for removing the particulate matter from an exhaust flow. During normal exhaust processor operation, exhaust flow is directed into a first region containing the primary substrate. During regeneration, a valve pivotally coupled to a processor housing is moved from a first position, where the exhaust flows into the first region, to a second position, where the exhaust is blocked from the first region and allowed to flow through a second region having the auxiliary substrate. The pivotally coupled valve is moved from the first position to the second position by a dedicated actuator. A burner is activated to heat the substrate and oxidize trapped particulate matter, thereby regenerating the substrate. After regeneration is complete, the pivot valve is returned to the first position. The '065 patent also describes an alternate embodiment that includes a slideably movable valve for diverting exhaust flow from the primary substrate to the auxiliary substrate and vice versa.

Although the exhaust processor of the '065 patent may reduce the particulate matter exhausted to the environment and reduce the buildup of particulate matter in the exhaust processor, the exhaust processor may be large and costly. For example, in order to prevent excessive backpressure within an engine system coupled to the exhaust processor, both the primary and auxiliary regions of the exhaust processor must be sufficiently large to handle the entire exhaust flow. This size requirement increases the cost of the exhaust processor. In addition, both the pivot valve and the slidably movable valve are configured to block only two substrates, making the exhaust processor of the '065 patent expansion-limited.

The disclosed particulate trap is directed to overcoming one or more of the problems set forth above.

SUMMARY OF THE INVENTION

In one aspect, the present disclosure is directed to a particulate trap that has a housing with an inlet and an outlet. The particulate trap also has a plurality of fluidly isolated filters stacked within the housing between the inlet and the outlet. The plurality of filters have a stack direction and a transverse direction. The particulate trap is configured to direct a flow of exhaust in the transverse direction through the plurality of filters. The particulate trap further has an actuator with a blocking portion configured for linear movement to selectively block exhaust flow through each of the plurality of filters.

In another aspect, the present disclosure is directed to a method of operating a particulate trap. The method includes filtering particulates from a flow of exhaust with a plurality of fluidly isolated filters stacked together in a stack direction. The exhaust flows in a transverse direction relative to the stack direction. The method further includes measuring an operating parameter of the particulate trap and linearly moving a blocking portion in the stack direction to selectively block exhaust flow through each of the plurality of filters when the measured operating parameter satisfies a predetermined condition. The method further includes selectively applying an electric current to each of the plurality of filters as exhaust flow through each of the plurality of filters is blocked.

DETAILED DESCRIPTION

Figure 1:
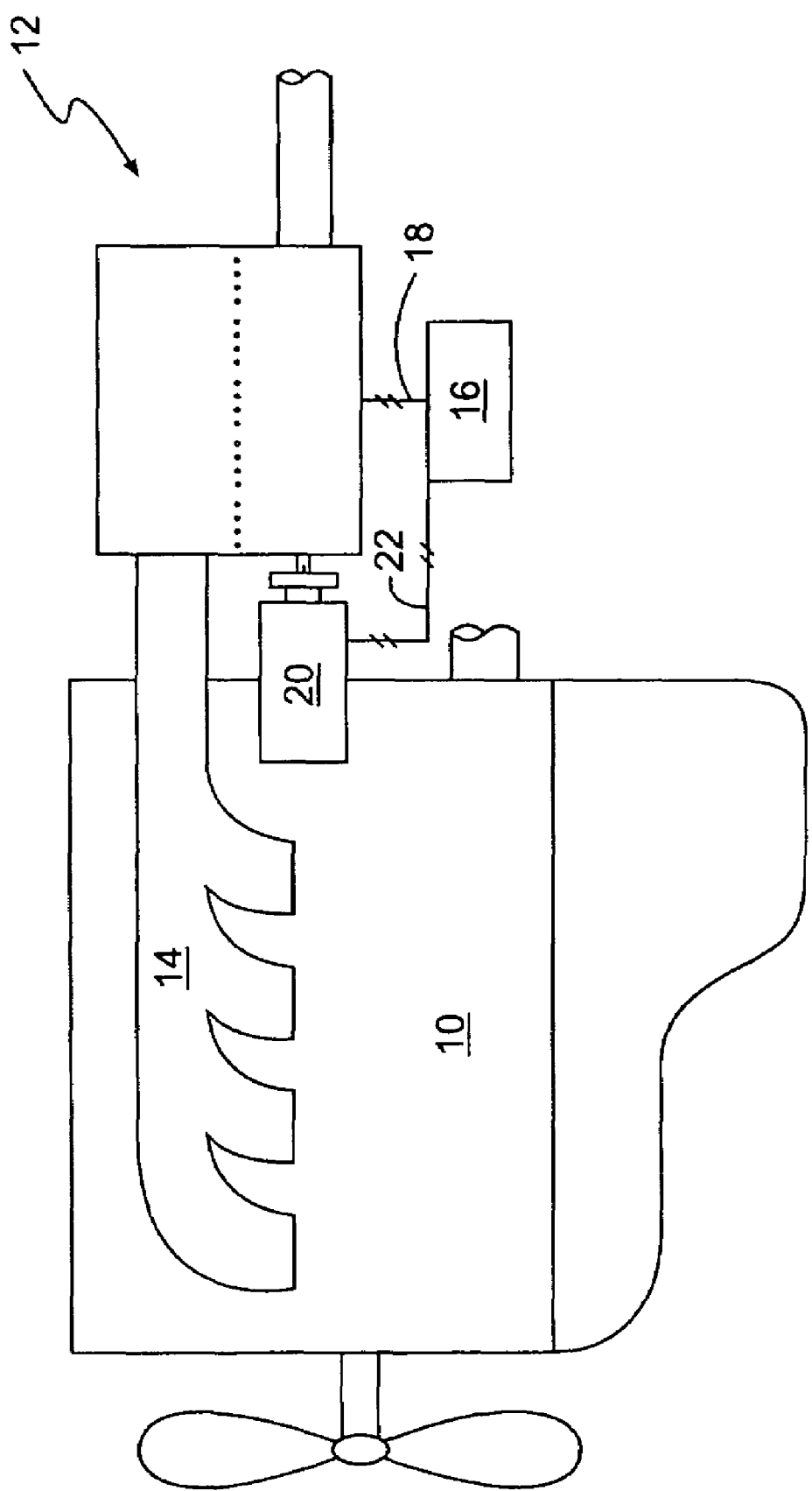
FIG. 1 is a pictorial illustration of an engine having a particulate trap according to an exemplary disclosed embodiment.
Figure 2A:
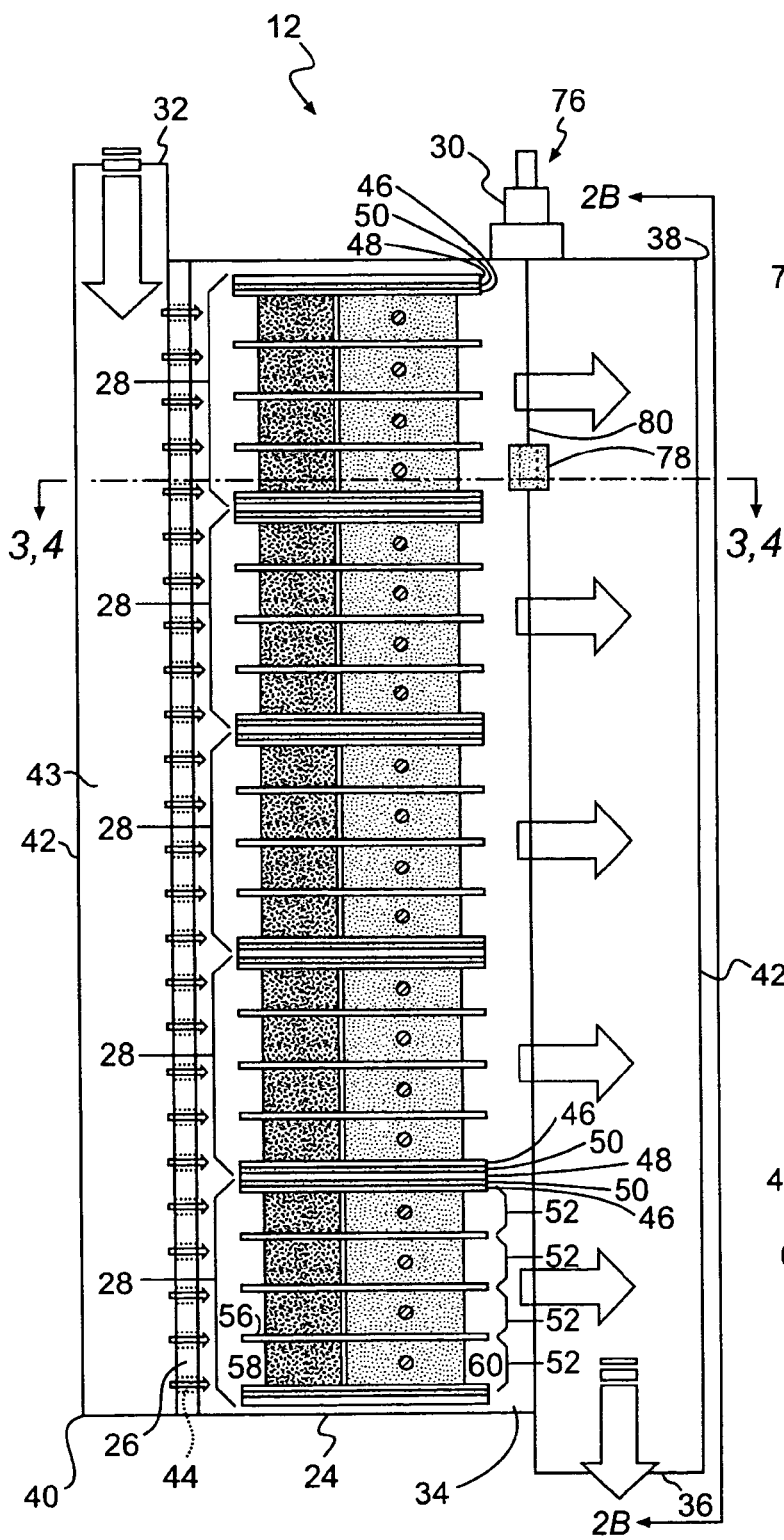
FIG. 2a is a cross-sectional front view pictorial illustration of a particulate trap according to an exemplary disclosed embodiment.
Figure 2B:
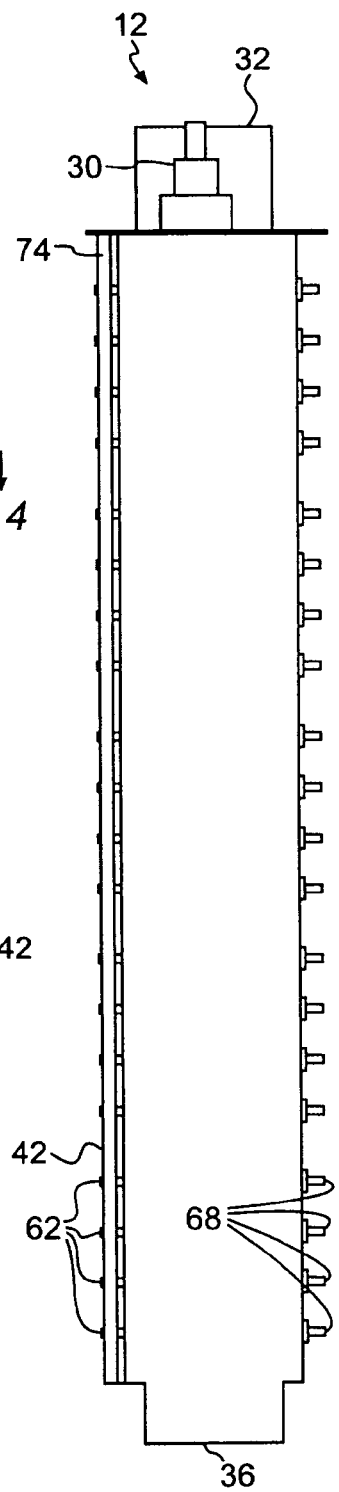
FIG. 2b is a side view pictorial illustration of a particulate trap according to an exemplary disclosed embodiment.

FIG. 1 illustrates an engine 10 having an exemplary particulate trap 12. Engine 10 may include an exhaust manifold 14 connecting an exhaust flow of engine 10 with particulate trap 12. A controller 16 may be in communication with particulate trap 12 via a communication line 18 and with a motor 20 via a communication line 22. As illustrated in FIGS. 2a and 2b, particulate trap 12 may include a housing 24, an acoustic element 26, one or more modular and independently replaceable filters 28, and an actuator 30.

Housing 24 may have an inlet 32 connected to exhaust manifold 14, a main chamber 34, and an outlet 36. Housing 24 may have a substantially oval-shaped cross-section along a length direction and may include a rounded outer surface 42. It is also contemplated that housing 24 may have a cross-sectional shape other than oval-shaped such as, for example, cylindrical, square, rectangular, or another appropriate shape. At least a portion of inlet 32 and outlet 36 may have a substantially circular cross-section. It is also contemplated that inlet 32 and outlet 36 may have a differently shaped cross-section such as square, rectangular, triangular, or other suitable cross-section. Inlet 32 and outlet 36 may be generally aligned with the length direction of housing 24 and may be disposed on opposite sides of main chamber 34. Both inlet 32 and outlet 36 may extend the entire length of main chamber 34 to provide exhaust flow to and away from each filter 28 in parallel. Inlet 32 may extend past main chamber and protrude from a first end 38 of particulate trap 12 in the length direction of housing 24. Outlet 36 may extend past main chamber 34 and protrude from a second end 40 of particulate trap 12.

Acoustic element 26 may include a perforated plate positioned between inlet 32 and main chamber 34 such that, together with an outer surface 42, a resonating chamber 43 is formed. Engine combustion noise may be attenuated by phase cancellation due to reflection of sound waves off of acoustic element 26 and outer surface 42, while holes 44 in acoustic element 26 allow exhaust from engine 10 to flow through particulate trap 12. Although acoustic element 26 is depicted as a reactive element, it is also contemplated that acoustic element 26 may include a dissipative element, an absorptive element, or any other means for reducing combustion noise of engine 10. It is further contemplated that acoustic element 26 may alternately be positioned between main chamber 34 and outlet 36.

Each filter 28 may be separated and sealed from other filters 28 by a divider 46, and a sealing mat 48. Divider 46 may be formed from an electrically non-conductive material to electrically insulate one filter 28 from an adjacent filter 28. Sealing mat 48 may be compressibly sandwiched between dividers 46 to fill the space between dividers 46, thereby fluidly isolating one filter 28 from an adjacent filter 28. A steel support plate 50 may be included to structurally support divider 46 and/or sealing mat 48. Support plate 50 may alternately be made of a material other than steel such as, for example, a ceramic material, a plastic material, or another suitable material. It is contemplated, however, that a single member may be disposed between filters 28 that provides for the electrical insulation needs, fluid isolation needs, and structural support needs of particulate trap 12.

Each filter 28 may include permanent sub-cartridges 52 having one or more serpentine-shaped metal fiber media 54 separated from metal fiber media 54 of adjacently stacked sub-cartridges 52 by additional electrically insulating dividers 56. Alternately, each of sub-cartridges 52 may include an electrically conductive ceramic filter media or electrically non-conductive ceramic filter media having electrically conductive fibers interwoven or dispersed within the ceramic filter media. Although a single column of sub-cartridges 52 stacked in layers is depicted in FIGS. 2-7, it should be noted that particulate trap 12 may include filters 28 with multiple rows and/or columns of sub-cartridges 52.

Insulating dividers 56, together with housing 24, may form separate fluid pathways through each sub-cartridge 52 with an inlet 58 and exit 60. Exhaust flow may be directed from inlet 58 transversely across serpentine-shaped metal fiber media 54 of sub-cartridges 52 to exit 60. Alternately, filters 28 may be rotated relative to housing 24, so that the exhaust flow may be directed longitudinally across metal fiber media 54.

Figure 3:
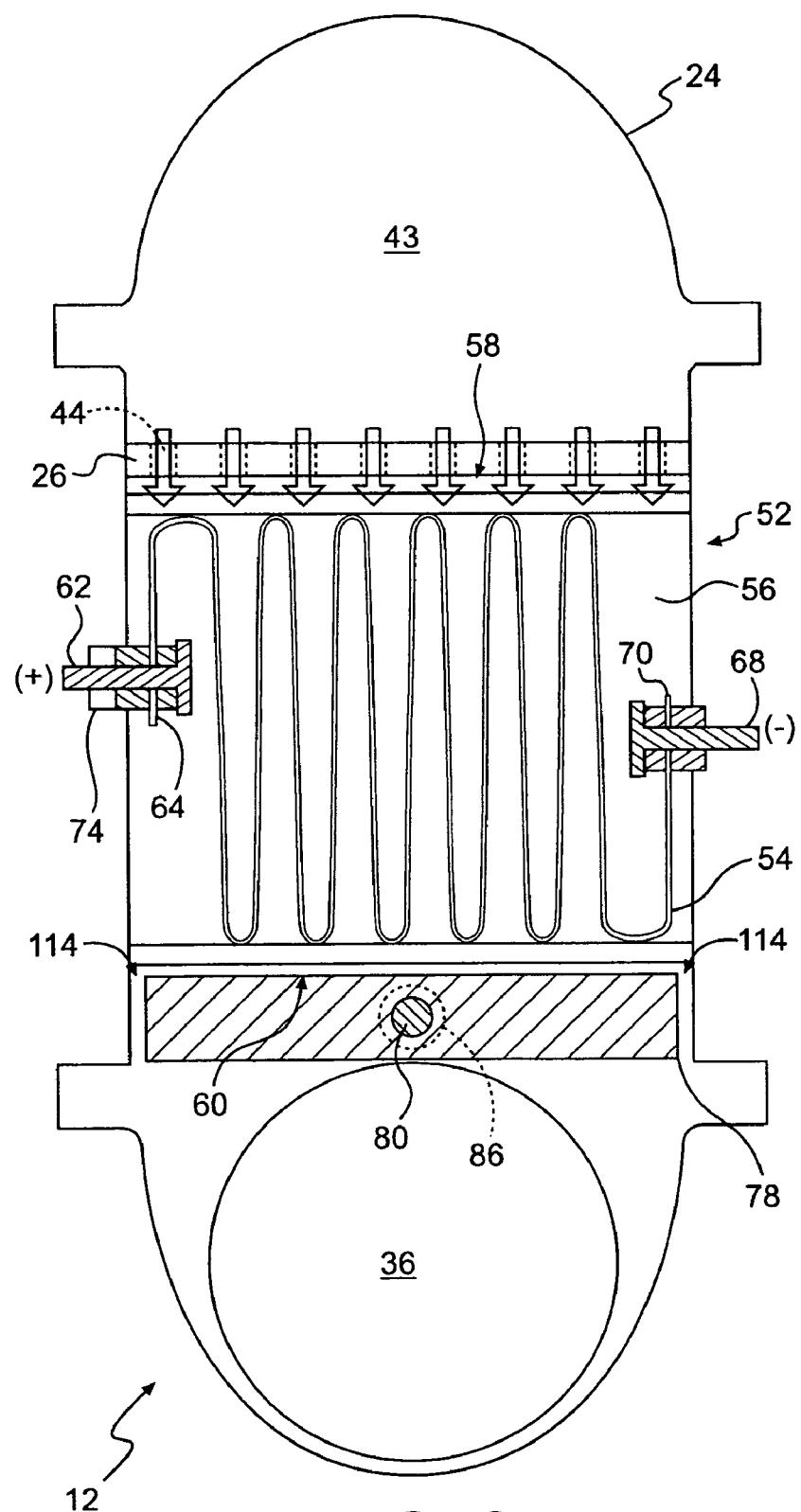
FIG. 3 is a cross-sectional top view pictorial illustration of a particulate trap according to an exemplary disclosed embodiment.

FIGS. 2B and 3 illustrate each of sub-cartridges 52 including a first electrical connector 62 extending from a first end 64 of metal fiber media 54 and a second electrical connector 68 extending from a second end 70 of metal fiber media 54. First end 64 and second end 70 may be oriented substantially orthogonal to a flow of exhaust from inlet 58 through exit 60. First and second electrical connectors 62, 68 may connect one or more sub-cartridges 52 to a power source (not shown) at a given time to form an electrical circuit. First and second electrical connectors 62, 68 may extend through housing 24 and may be connected to the power source via permanent or quick disconnect connectors. In addition, first electrical connectors 62 may be connected to each other via a common bus bar 74. It is also contemplated that first electrical connectors 62 may be connected to each other via crimped connectors, ring terminals, or in any other manner known in the art. It is further contemplated that second electrical connectors 68 may be connected to each other, respectively, via a common bus. It should be noted that reference characters not presented with the detailed discussion of FIG. 3 are presented elsewhere in the specification.

Figure 4:
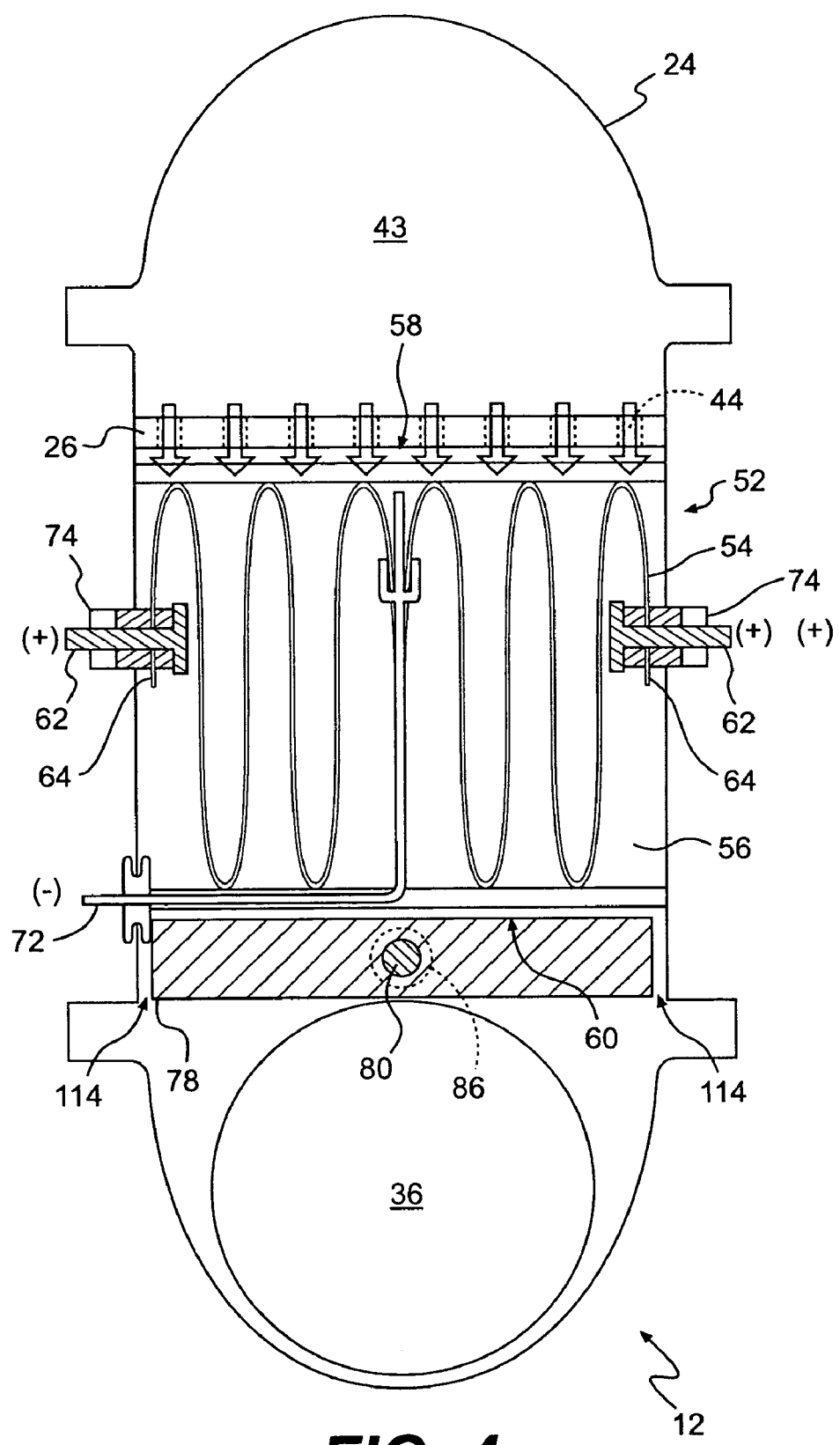
FIG. 4 is a cross-sectional top view pictorial illustration of a particulate trap according to an exemplary disclosed embodiment.

As illustrated in FIG. 4, when multiple metal fiber media 54 are included in a single sub-cartridge 52, a common electrical connector 72 may electrically interconnect each of metal fiber media 54 within the same sub-cartridge 52. First connectors 62 and common electrical connectors 72 may connect one or more sub-cartridges 52 to the power source at a given time to form an electrical circuit. Common electrical connectors 72 may also extend through housing 24 and may be connected to the power source via permanent or quick disconnect connectors. It is contemplated that common electrical connectors 72 may be connected to each other via a common bus bar. It should be noted that reference characters not presented with the detailed discussion of FIG. 4 are presented elsewhere in the specification.

Figure 5:
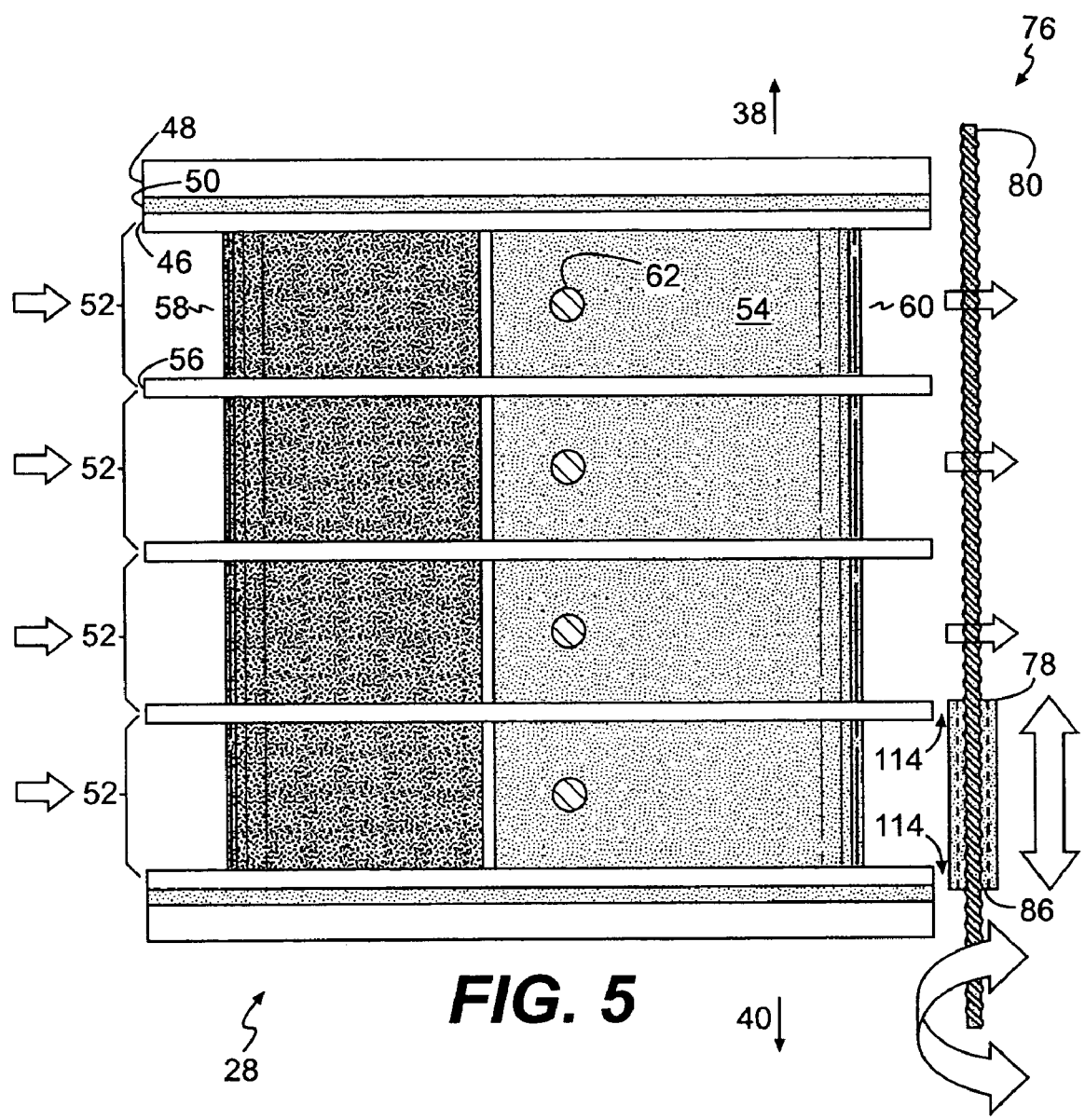
FIG. 5 is a cross-sectional front view pictorial illustration of a sub-cartridge for a particulate trap according to an exemplary disclosed embodiment.

Actuator 30 may include a drive means 76 connected to motor 20 (referring to FIG. 1) and a blocking portion 78 (shown in FIG. 5). Drive means 76 may include a lead screw 80, such as a ball screw, a planetary roller screw, a frictional roller screw, or any other type of lead screw that translates rotational motion of motor 20 into linear motion of blocking portion 78. Drive means 76 may be rotatably connected to first end 38 and extend through second end 40 of particulate trap 12 to connect with motor 20. Actuator 30 may be disposed between main chamber 34 and outlet 36 (referring to FIG. 2A). It is also contemplated that actuator 30 may alternately be disposed between inlet 32 and main chamber 34.

Blocking portion 78 may be configured to selectively block exhaust flow through each sub-cartridge 52 by linear movement past one or more exits 60 associated with each sub-cartridge 52. Blocking portion 78 may be generally rectangular-shaped, having a length, width, and thickness direction. Blocking portion 78 may include internal threads 86 centrally located relative to the length and width directions of blocking portion 78. Internal threads 86 may be circumferentially disposed about a central through hole. It is contemplated that threads 86 may be absent and bearings, or any other means for engaging threads of lead screw 80, may be included. Blocking portion 78 may include a means for maintaining constant orientation of blocking portion 78 relative to sub-cartridge 52 as lead screw 80 is rotated to cause linear translation of blocking portion 78. Such means may include, for example, protrusions on opposite ends of blocking portion 78 configured to engage channels within housing 24, bearings configured to run within tracks connected to housing 24, one or more guide rods attached to housing 24 and configured to engage bearing sleeves within blocking portion 78, a second lead screw configured to engage additional internal threads within blocking portion 78, or any other means known in the art. A clearance 114 may be maintained between insulating dividers 56 and blocking portion 78 to provide for some exhaust to flow, even when blocking portion 78 is in the blocked position relative to sub-cartridges 52. The term blocked, for the purposes of this disclosure, may refer to any amount of air flow restriction from partially restricted to fully restricted.

Figure 6:
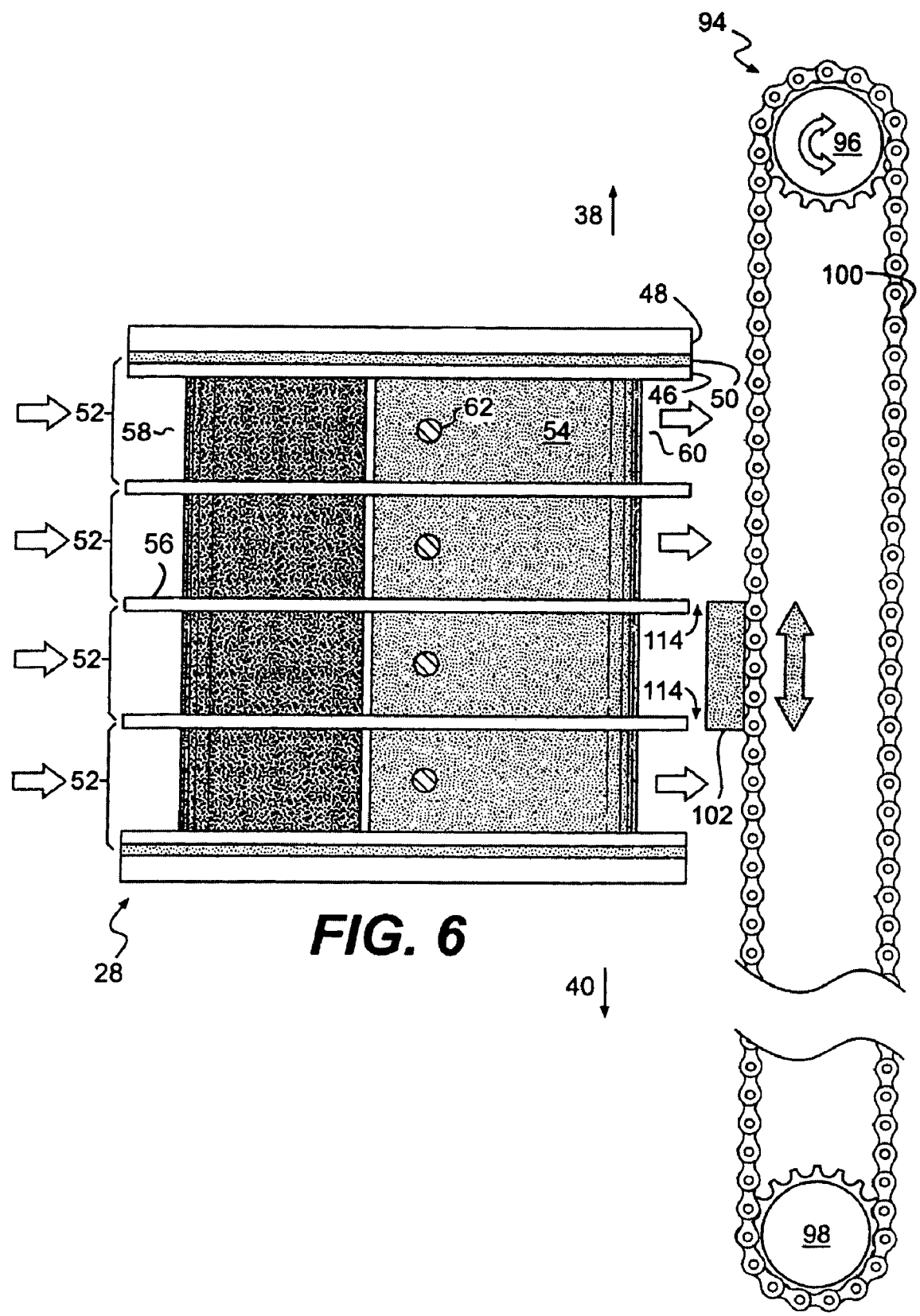
FIG. 6 is a cross-sectional front view pictorial illustration of a sub-cartridge for a particulate trap according to an exemplary disclosed embodiment.

In an exemplary embodiment illustrated in FIG. 6, actuator 30 may include a drive means 94 having a first spool 96, a second spool 98, and a belt 100, with a blocking portion 102 attached to belt 100. First and second spools 96, 98 may include any means for connecting motor 20 to belt 100 such as, for example, a pulley, a sprocket, a cog, or any other means known in the art. First spool 96 may be disposed towards first end 38 of particulate trap 12 and operatively connected to motor 20. Second spool 98 may be disposed towards second end 40 of particulate trap 12. Belt 100 may be any means known in the art for transferring rotation of motor 20 to linear motion of blocking portion 102 such as, for example, a flexible reinforced polymer, a linked chain, a metallic cable, or any other means known in the art. Belt 100 may be an endless-type belt wrapped around first and second spools 96, 98. However, it is also contemplated that belt 100 may have a first end wrapped around first spool 96 and a second end wrapped around second spool 98. First spool 96 may be engaged with motor 20 to cause belt 100 to move and second spool 98 to operate in slave rotation as motor 20 rotates. It is also contemplated that second spool 98 may be directly driven by motor 20 and first spool 96 may operate as the slave spool. It is further contemplated that first and second spools 96, 98 may both be driven directly by motor 20 or by separate motors.

Blocking portion 102 may have a generally rectangular shape with a length direction, a width direction, and a thickness direction. Blocking portion 102 attached to belt 100 may linearly move in the length direction along with belt 100 to selectively block exhaust flow exits 60 of sub-cartridges 52. Blocking portion 102 may or may not have an alignment means for aligning blocking portion 102 with exit 60 of sub-cartridges 52 and for maintaining clearance 114 between insulating dividers 56 and blocking portion 102. These alignment means may include, for example, protrusions on opposite ends of blocking portion 102 configured to engage channels within housing 24, bearings configured to run within tracks connected to housing 24, or any other means known in the art.

Figure 7:
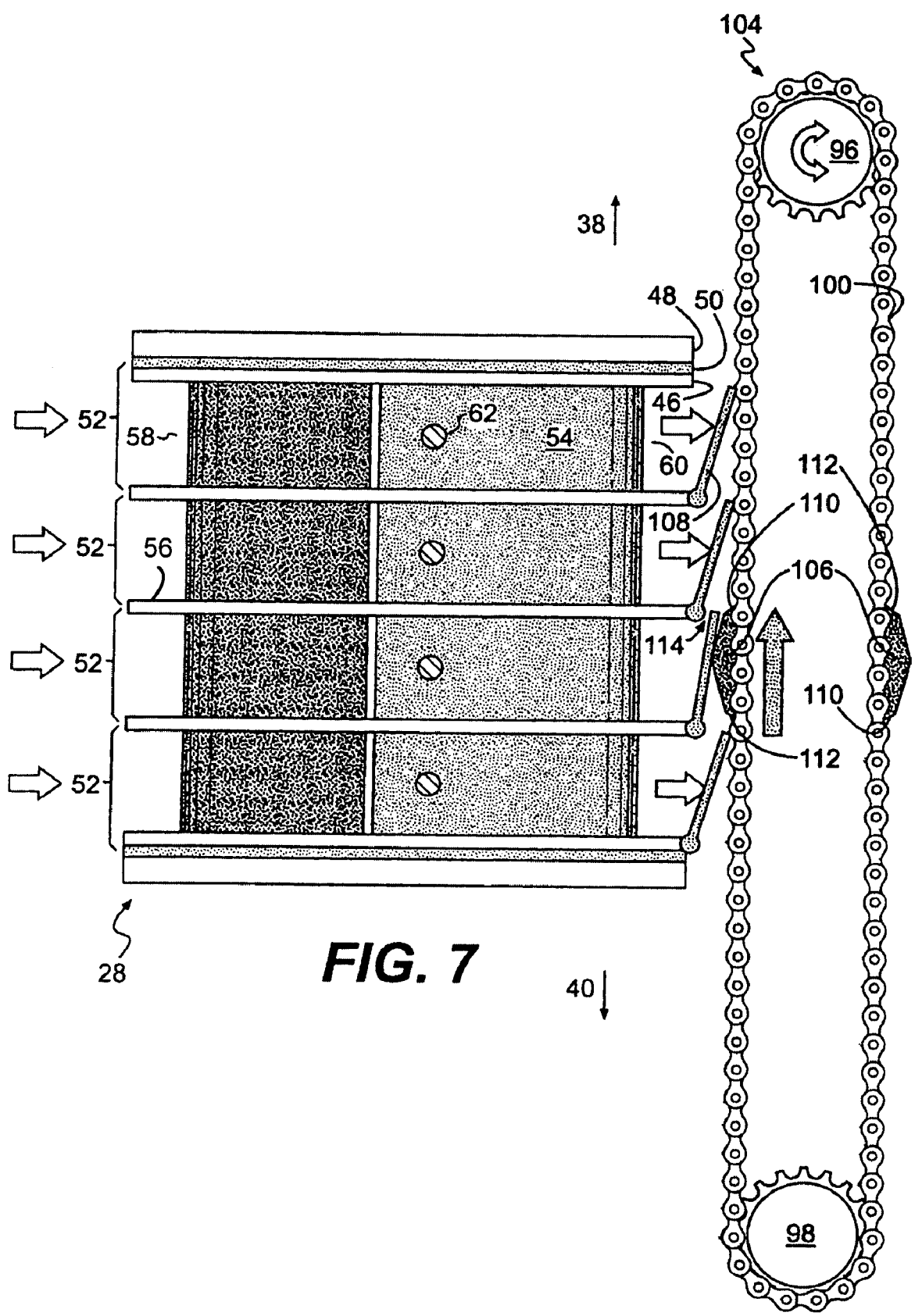
FIG. 7 is a cross-sectional front view pictorial illustration of a sub-cartridge for a particulate trap according to an exemplary disclosed embodiment.

In the exemplary embodiment of FIG. 7, actuator 30 may include a drive means 104 having two blocking portions 106 attached to belt 100. In this embodiment, actuator 30 may also include a hinged portion 108 associated with each sub-cartridge 52 and having a first position and a second position. In the first position, exhaust may be allowed to flow through each respective sub-cartridge 52. In the second position, exhaust may be blocked. In contrast to the blocking portions 78 and 102 of FIGS. 5 and 6, blocking portions 106 of FIG. 7 do not directly block exhaust through each sub-cartridge 52. Blocking portions 106 may, however, be configured to move each hinged portion 108 from the first position to the second position, thereby indirectly blocking the exhaust flow. Similar to the embodiments of FIGS. 5 and 6, a clearance 114 may be maintained between insulating dividers 56 and hinged portion 108.

Each of blocking portions 106 may be configured to reduce stress induced on hinged portion 108 during movement of each hinged portion 108 from the first position to the second position. In particular, blocking portion 106 may have a first angled surface 110 facing the direction of movement of blocking portion 106 and a second angled surface 112 disposed opposite the first angled surface 110. First and second angled surfaces 110 and 112 may reduce stress imparted on hinged portion 108 as blocking portions 106 engage and disengage hinged portions 108. It is also contemplated that blocking portions 106 may have a greater or lesser number of angled surfaces, or that the surfaces may be a shape other than angled such as, for example, round. Each of blocking portions 106 may be spaced a predetermined distance apart from each other along belt 100 and may be configured to cause exhaust to simultaneously be blocked through one or more sub-cartridges 52.

Controller 16 (referring to FIG. 1) may include various components to operate particulate trap 12 such as, for example, a memory, a secondary storage device, and a processor. Various circuits may be associated with controller 16 such as, for example, power supply circuitry, signal conditioning circuitry, solenoid driver circuitry, and other appropriate circuitry.

Motor 20 (referring to FIG. 1) may be connected to lead screw 80 of FIGS. 2a, 3, 4, and 5 or to first spool 96 and/or to second spool 98 of FIGS. 6 and 7 to cause blocking portions 78, 102, and 106 to linearly move in the particulate trap length direction between ends 38 and 40. Motor 20 may rotate continuously or in a step-wise manner. Motor 20 may be electrically driven, mechanically driven, hydraulically driven, pneumatically driven, or driven in any other manner known in the art. Motor 20 may be directly connected to lead screw 80, first spool 96, and/or second spool 98, or may be connected via a ratcheting device, a pulley system, a gear system, or in any other appropriate manner.

It is also contemplated that motor 20 may be absent and a different actuator included such as, for example, a hydraulic device, a solenoid device, a piezo device, or another means for actuating. The different actuator may be connected to drive means 76, 94, or 104 via a ratcheting mechanism, a rack and gear mechanism, a screw and gear mechanism, or in any other manner known in the art.

INDUSTRIAL APPLICABILITY

The disclosed particulate trap may be applicable to any combustion-type device such as, for example, an engine, a furnace, or any other device known in the art where the removal of particulate matter from an exhaust flow is desired. Particulate trap 12 may be a simple, inexpensive, and compact solution to reducing the amount of particulate matter exhausted to the environment. Because of its modular design and common drive means and blocking portions, particulate trap 12 may be easily expanded to accommodate a range of filtering requirements. In addition, because filters 28 are independently replaceable, restricted, damaged, or otherwise unusable filters 28 may be easily and independently replaced at a lower cost than would be required to replace the entire particulate trap 12. Separately regenerable sub-cartridges 52 have low power requirements for regeneration, allowing for low-cost power electronics and high engine efficiency. In addition, because the disclosed particulate trap does not require a centralized valve assembly, particulate trap 12 may have a high degree of design flexibility. The operation of particulate trap 12 will now be explained in detail.

According to an exemplary embodiment of particulate trap 12, exhaust flow may be directed into resonating chamber 43 of particulate trap 12 through inlet 32, as illustrated in FIG. 2*a*. As explained above, resonating chamber 43 may reduce the combustion noise output of engine 10 by phase cancellation due to reflection of the sound waves off of acoustic element 26 and outer surface 42. The exhaust flow may then be directed through holes 44 of acoustic element 26, through filters 28 disposed within main chamber 34, to exit particulate trap 12 via outlet 36.

As exhaust flows through filters 28, particulate matter may be removed from the exhaust flow by metal fiber media 54 of sub-cartridges 52. Over time, the particulate matter may build up in metal fiber media 54. If left unchecked, the particulate matter buildup could be significant enough to partially or even fully restrict the flow of exhaust through metal fiber media 54, allowing for pressure within the exhaust system of engine 10 to increase. An increase in the back-pressure of engine 10 could reduce the engine's ability to draw in fresh air, resulting in decreased performance of engine 10.

To prevent the undesired buildup of particulate matter within particulate trap 12, individual sub-cartridges 52, within a particular filter 28, may be independently regenerated. Regeneration may be periodic or based on a triggering condition. The triggering condition may be, for example, a lapsed time of engine operation, a pressure differential measured across particulate trap 12, or any other condition known in the art.

Controller 16 may be configured to cause regeneration of sub-cartridges 52. When controller 16 of FIGS. 2*a*-5 determines that regeneration is required (e.g., when the engine has operated for a predetermined time period, or when a pressure measured across particulate trap 12 is greater than a predetermined value), controller 16 may cause lead screw 80 to rotate with respect to housing 24. As lead screw 80 rotates, blocking portion 78 will linearly translate to align with exit 60 of at least one sub-cartridge 52 to block exhaust through the at least one sub-cartridge 52. Exhaust flow through each of sub-cartridges 52, when blocked, may be limited to, for example, about 0.5%-2.0% of the flow through an unblocked sub-cartridge 52. Some flow of exhaust through blocked sub-cartridge 52 may be necessary to provide sufficient oxygen for combustion of the particulate matter trapped within sub-cartridge 52.

Likewise, when controller 16 of FIGS. 6 and 7 determines that regeneration is required, controller 16 may cause belt 100 to move about first and second spools 96, 98. As belt 100 moves about first and second spools 96, 98, blocking portion 102 of FIG. 6 will align with exit 60 of at least one sub-cartridge 52 to block exhaust through sub-cartridge 52. Similarly, as belt 100 moves about first and second spools 96, 98 of FIG. 7, blocking portion 106 will engage hinged portion 108 to move hinged portion 108 from the first position to the second position, thereby blocking exhaust flow through at least one sub-cartridge 52.

When the exhaust flow is blocked through sub-cartridge 52, controller 16 may connect the power source via first and second electrical connectors 62, 68, and/or common electrical connector 72 to the blocked sub-cartridge 52. Current from the power source may cause the blocked sub-cartridge 52 to resistively heat up above the combustion temperature of the particulate matter trapped within the at least one blocked sub-cartridge 52, thereby burning away the buildup of particulate matter.

Blocking the exhaust flow from regenerating sub-cartridge 52 may reduce the energy required for regeneration because the exhaust flow, which is comparatively cool relative to the regeneration temperature, may remove heat during the regeneration process. In addition, because sub-cartridge 52 undergoing regeneration is substantially fluidly isolated from other sub-cartridges 52 within the same particulate trap 12, the exhaust flowing through non-regenerating sub-cartridges 52 does not affect the amount of energy required to regenerate the fluidly isolated sub-cartridge 52. In addition, because a single sub-cartridge 52 may be blocked at a given time, the increase in back pressure may be negligible and the overall size of particulate trap 12 may be reduced.

It will be apparent to those skilled in the art that various modifications and variations can be made to the disclosed particulate trap. Other embodiments will be apparent to those skilled in the art from consideration of the specification and practice of the disclosed particulate trap. It is intended that the specification and examples be considered as exemplary only, with a true scope being indicated by the following claims and their equivalents.

What is claimed is:

1. A particulate trap, comprising:
   a housing having an inlet and an outlet;
   a plurality of substantially fluidly isolated filters stacked within the housing, between the inlet and the outlet, wherein the filters have a stack direction and a transverse direction, the particulate trap being configured to direct a flow of exhaust in the transverse direction through the plurality of filters; and
   an actuator having a blocking portion configured for linear movement to selectively block exhaust flow through each of the plurality of filters, the blocking portion disposed downstream of the plurality of filters.

2. The particulate trap of claim 1, wherein the blocking portion is configured to block exhaust flow through at least one of the plurality of filters at a given time.

3. The particulate trap of claim 1, wherein the linear movement of the actuator is in the stack direction.

4. The particulate trap of claim 1, wherein each of the plurality of filters includes a plurality of sub-cartridges and the blocking portion is configured to block exhaust flow through each of the plurality of sub-cartridges.

5. The particulate trap of claim 4, wherein each of the plurality of sub-cartridges is separated from another of the plurality of sub-cartridges by an electrically insulating divider.

6. The particulate trap of claim 4, wherein each of the plurality of sub-cartridges includes a first metal fiber media.

7. The particulate trap of claim 6, wherein at least one of the plurality of sub-cartridges includes a second metal fiber media connected to the first metal fiber media by a common electrode.

8. The particulate trap of claim 4, wherein the blocking portion is configured to always block exhaust flow through at least one of the plurality of sub-cartridges.

9. The particulate trap of claim 4, wherein each of the plurality of sub-cartridges includes a first electrode protruding from a first sub-cartridge face and a second electrode protruding from a second sub-cartridge face opposite the first.

10. The particulate trap of claim 9, further including an electrical circuit in separate communication with each of the plurality of sub-cartridges via the first and second electrodes to cause resistance heating as exhaust flow is selectively blocked through each of the plurality of sub-cartridges.

11. The particulate trap of claim 10, further including a controller in communication with the particulate trap and configured to cause the electrical circuit to apply the electric current when a predetermined condition has been met.

12. The particulate trap of claim 11, wherein the predetermined condition includes a lapsed time period of exhaust flow through each of the plurality of filters.

13. The particulate trap of claim 11, wherein the predetermined condition includes a pressure differential across the plurality of filters being greater than a predetermined pressure differential.

14. The particulate trap of claim 9, wherein the first and second electrodes protrude in the transverse direction and extend through the housing.

15. The particulate trap of claim 9, further including a common bus bar electrically connecting each of the first electrodes to one another.

16. The particulate trap of claim 1, wherein the actuator further includes a lead screw and the blocking portion is configured to engage the lead screw to cause the blocking portion to move along the lead screw in the stack direction as the lead screw is rotated.

17. The particulate trap of claim 1, wherein the actuator further includes:
a first spool operatively disposed towards a first end of the plurality of filters;
a second spool operatively disposed towards a second end of the plurality of filters, opposite the first end in the stack direction; and
a belt operatively connected to the first and second spools, wherein the blocking portion is attached to the belt and configured to move as at least one of the first and second spools is rotated.

18. The particulate trap of claim 1, wherein the actuator further includes a plurality of hinged portions associated with the plurality of filters and having a first position where fluid flows through the plurality of filters and a second position where fluid is blocked, the blocking portion being configured to move the hinged portion from the first position to the second position.

19. The particulate trap of claim 18, wherein each of the plurality of filters includes a plurality of sub-cartridges and each of the plurality of hinged portions is associated with a different one of the plurality of sub-cartridges.

20. The particulate trap of claim 1, wherein the actuator includes a motor.

21. The particulate trap of claim 1, wherein the actuator is located on a downstream side of the plurality of filters relative to a flow of exhaust through the plurality of filters.

22. The particulate trap of claim 1, further including an acoustic element.

23. The particulate trap of claim 22, wherein the acoustic element is disposed on an upstream side of the plurality of filters relative to a flow of exhaust through the plurality of filters and includes a perforated member.

24. The particulate trap of claim 1, further including a sealing member operatively disposed between each of the plurality of filters and configured to fluidly isolate each of the plurality of filters.

25. The particulate trap of claim 24, further including a support plate operatively attached to the sealing member.

26. A method of operating a particulate trap, the method comprising:

filtering particulates from a flow of exhaust with a plurality of substantially fluidly isolated filters stacked together in a stack direction, the exhaust flowing in a transverse direction relative to the stack direction;
measuring an operating parameter of the particulate trap;
linearly moving a blocking portion in the stack direction to selectively block exhaust flow through each of the plurality of filters when the measured operating parameter satisfies a predetermined condition, the blocking portion disposed downstream of the plurality of filters; and
selectively applying an electric current to each of the plurality of filters as exhaust flow through each of the plurality of filters is blocked.

27. The method of claim 26, wherein the operating parameter is a lapsed time period of exhaust flow through at least one of the plurality of filters.

28. The method of claim 26, wherein the operating parameter is a pressure of the exhaust flow measured across at least one of the plurality of filters.

29. The method of claim 26, wherein the blocking portion includes an internally-threaded portion configured to engage a lead screw, and linearly moving the blocking portion includes rotating the lead screw to cause the blocking portion to move along the lead screw in the stack direction.

30. The method of claim 26, wherein the blocking portion is connected to a belt disposed between a first spool and a second spool, and linearly moving the blocking portion includes rotating at least one of the first and second spools to cause the belt to move in the stack direction.

31. The method of clam 30, wherein the blocking portion engages a plurality of hinged members to selectively move each of the plurality of hinged members from a first position where exhaust is allowed to flow relative to each of the hinged members to a second position where exhaust is blocked.

32. The method of claim 26, wherein selectively blocking exhaust flow through each of the plurality of filters includes selectively blocking exhaust flow through each of a plurality of sub-cartridges within each of the plurality of filters.

33. The method of claim 32, wherein selectively blocking exhaust flow through each of the plurality of sub-cartridges includes restricting the flow of exhaust to about 2% or less of an unblocked exhaust flow through each of the plurality of sub-cartridges.

34. The method of claim 32, wherein selectively applying an electric current to each of the plurality of filters includes selectively applying an electric current to each of the plurality of sub-cartridges as each of the plurality of sub-cartridges is blocked.

35. The method of claim 26, wherein selectively blocking exhaust flow is accomplished downstream of the flow of exhaust relative to the plurality of filters.

36. The method of claim 26, further including directing the flow of exhaust through an acoustic element.

37. The method of claim 36, wherein directing the flow of exhaust through an acoustic element is accomplished upstream of the flow of exhaust relative to the plurality of filters.

38. A power system, comprising:
a power source operable to produce a flow of exhaust; and
a particulate trap configured to receive the flow of exhaust, the particulate trap including:
a housing having an inlet and an outlet;
a plurality of substantially fluidly isolated filters stacked within the housing, between the inlet and the outlet, wherein the stacked filters have a stack direction and a transverse direction, each of the plurality of filters includes a plurality of sub-cartridges, and the particulate trap is configured to direct a flow of exhaust in the transverse direction through the plurality of sub-cartridges;

an actuator having a blocking portion configured for linear movement in the stack direction and configured to selectively block exhaust flow through at least one of the plurality of sub-cartridges, the blocking portion disposed downstream of the plurality of filters;

an electrical circuit in communication with each of the plurality of sub-cartridges and configured to selectively apply an electric current to the at least one of the plurality of sub-cartridges as the exhaust flow is blocked through the at least one of the plurality of sub-cartridges; and a controller in communication with the particulate trap and configured to cause the electrical circuit to apply the electric current when a predetermined condition has been met.

39. The power system of claim 38, wherein the actuator further includes a lead screw, and the blocking portion is configured to engage the lead screw to cause the blocking portion to move along the lead screw in the stack direction as the lead screw is rotated.

40. The power system of claim 38, wherein the actuator further includes:

a first spool operatively disposed towards a first end of the plurality of filters;

a second spool operatively disposed towards a second end of the plurality of filters, opposite the first end in the stack direction; and a belt operatively connected to the first and second spools, wherein the blocking portion is attached to the belt and configured to move as at least one of the first and second spools is rotated.

41. The power system of claim 38, wherein the actuator further includes a plurality of hinged portions, one of the plurality of hinge portions is associated with each the plurality of sub-cartridges and configured to be moved from a first position where fluid flows through the plurality of filters and a second position where fluid is blocked, the blocking portion being configured to move the hinged portion from the first position to the second position.

42. The power system of claim 38, further including an acoustic element.

* * * * *